United States Patent [19]

Adler

[11] 4,064,784
[45] Dec. 27, 1977

[54] DRILL TIP AND THREADED FASTENER

[76] Inventor: Robert B. Adler, 6855 Cornell Road, Cincinnati, Ohio 45242

[21] Appl. No.: 642,664

[22] Filed: Dec. 19, 1975

Related U.S. Application Data

[63] Continuation-in-part of Ser. No. 573,474, May 1, 1975, abandoned.

[51] Int. Cl.² .............................................. F16B 25/00
[52] U.S. Cl. ......................................... 85/41; 408/226
[58] Field of Search .................... 85/41, 47; 408/228, 408/227, 226, 230, 229; 10/10 R

[56] References Cited

U.S. PATENT DOCUMENTS

| 1,309,706 | 7/1919 | Taylor | 408/230 |
| 3,221,588 | 12/1965 | Wieber | 151/38 X |
| 3,395,603 | 8/1968 | Skierski | 85/47 |
| 3,463,045 | 8/1969 | Prescott | 85/41 |

FOREIGN PATENT DOCUMENTS

| 1,316,157 | 5/1973 | United Kingdom | 85/41 |

Primary Examiner—Ramon S. Britts
Attorney, Agent, or Firm—Wood, Herron & Evans

[57] ABSTRACT

A drill tip formed from two elements, each being one-half of a concave-convex spade-like element, the elements being joined integrally, the elements presenting a cutting edge which is a continuous curve extending from one side of the tip to the other through the pilot end of the tip.

16 Claims, 11 Drawing Figures

DRILL TIP AND THREADED FASTENER

This is a continuation-in-part of pending application Ser. No. 573,474 filed May 1, 1975, entitled Drilling Screw Fastener, now abandoned.

This invention relates to a drill tip, and more particularly, the invention is directed to a drill tip for a drill screw.

There are disclosures in the prior art of a wide variety of drill screw configurations and drill tips associated with the drill screws. Some of these are on the market. While there are a great many variations and configurations, generally they have certain common characteristics. At the pilot end of the screw, that is, the leading or front end of the screw, the end is configurated similarly to the pilot end of a twist drill. The pilot end has two cutting surfaces terminating in cutting edges. The cutting edges either come to a point or are slightly spaced from the axis of the screw and are interconnected by a chisel edge. The cutting edges form an angle usually about 118°, that is, each edge is at 59° to the axis of the screw.

A pair of flutes beginning at the cutting edges wind helically along the length of the shank for chip clearance. The shank has screw threads which begin rearwardly of the flutes. The threads have a greater diameter than the diameter of the drill tip and are adapted to be threaded into a metal plate after the drill portion of the screw has formed a hole.

An objective of the present invention has been to provide a drill tip which may or may not be associated with a threaded shank, the drill tip providing the following features:

a. improved starting characteristics;
b. improved chip clearing characteristics; and
c. improved thread gripping characteristics by virtue of the leaving on the far side of a plate a rim of extruded material from the hole formed by the drilling.

These features are provided by a new drill tip formed from two concave-convex, half, spade-like elements which are integrally joined at their axes. These elements provide a thin cutting edge formed as a continuous curve from the shank around the tip or pilot end of the drill tip to the other side of the shank. The spade-like elements also provide a cutting surface which extends from the cutting edge substantially to the axis of the shank, thereby providing a very substantial flute area to facilitate chip clearance and removal. Further, the cutting edge has a large dimension in the axial direction, that dimension being greater than the diameter of the shank.

As indicated, the cutting edge is one continuous curve from shank to shank and has no chisel edge at the tip as is common with prior art drill tips. Rather, the tip is an arcuate continuation of the two cutting edges, that is, the two cutting edges, one on each side of the axis of the shank, merge together in an approximate arc of a circle whose center is on the axis of the shank, and provides an unexpectedly improved starting capability heretofore unavailable in drills of this type. The arcuate cutting edge at the pilot end of the drill tip exposes the cutting edge to the metal as quickly as possible to start cutting away material and starting a hole. For example, in drilling into the cylindrical wall of a tubular member, it is normally necessary first to dimple the surface of the tubular member in order to provide a point for starting the drill. With the drill tip of the present invention, the cylindrical surface of the tubular member may be engaged and pressure applied as the drill tip is rotated and the drill makes a direct entry into the surface without the walking or sliding over the surface.

The spade-like configuration of the tip provides a substantial flute area for chip clearance. In practice, a conventional drill will create a helically curled chip which rides up the flute and will sometimes clog a flute in deep holes and/or in soft metal. The drill tip of the present invention, on the other hand, tends to clip such curls short and spits them out along the enlarged flute area. Thus, the cutting edges are kept free of clogging cut material and are continuously effective for metal removal as the drill tip is advanced through the hole.

When the drill tip is used in association with a threaded shank as in a drill screw, an improved fastening capability is provided. For reasons not completely understood, the drill tip leaves an extruded rim of metal surrounding the hole on the downstream side of the hole, the extruded rim providing a substantial portion of metal gripped by the screw threads, thereby increasing the effective thickness of the plate which is engaged by the screw threads. This feature is particularly useful in thin gauge materials.

While the phenomenon is not completely understood, it is believed that the formation of the extruded rim is provided in part by the thin, spade-like configuration of the drill tip which bursts through the metal without completely reaming it, and in part by the fact that the cutting edge has an axial dimension greater than the diameter of the shank so as to leave a greater flange of uncut metal the instant that the drill tip bursts through the plate.

The cutting edge has two radii. At the tip or pilot end, the radius having its center on the axis of the shank is approximately 0.045 inch and the arc at the tip is about one-quarter of a circle. That starting edge flows continuously into the arc of a larger circle rearwardly to the point of greatest diameter on the cutting edge, the radius of the rearward arcuate portion being approximately three times the radius of the smaller arc at the pilot end and having its center offset to the far side of the axis of the shank. The two arcuate portions combine to provide the substantial axial dimension of the cutting edge and to provide the spade-like configuration of the drill tip with the attendant advantageous features described herein.

Conventional drill screws have cutting edges of a very shallow axial dimension and, hence, cut away considerably more of the metal before penetrating the downstream side of the hole in the plate. Further, the web or lands in conventional drill screws are considerably thicker than the webs or lands of the present invention and are provided with cutting edges for the purpose of reaming the hole. During the cutting, the reaming action will tend to cut away the extruded rim which the drill tip of the present invention will more reliably leave.

Another advantage of the present drill tip is that it will always drill a hole equal to the dimension across its largest diameter or apex, even if the cutting edges are not perfectly symmetrical about its axis. A conventional drill, on the other hand, will drill a hole larger than the diameter of the tip if the pilot tip or point is off center.

The several objectives and features of the invention will become more readily apparent from the following detailed description taken in conjunction with the accompanying drawings in which.

Figure 1:
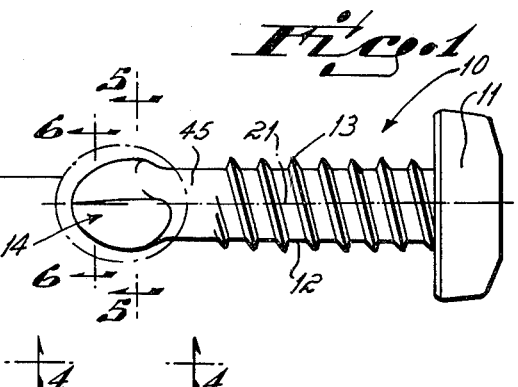
FIG. 1 is a side elevational view of a drill screw having the drill tip of the present invention.
Figure 1A:
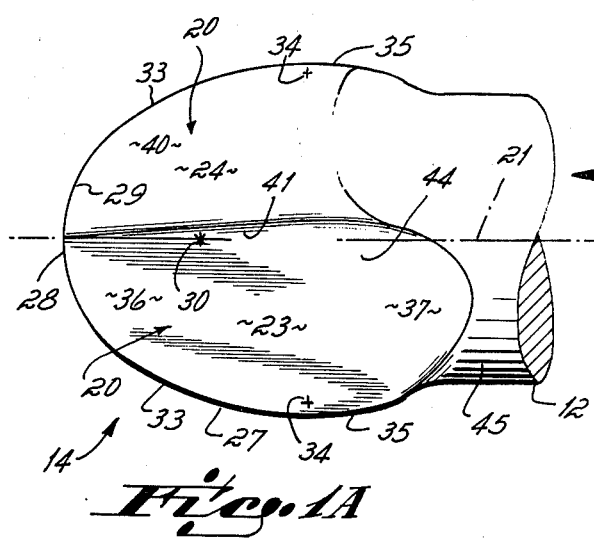
FIG. 1A is an enlarged view of the encircled area of FIG. 1.

Referring to the drawings, a drill screw indicated at 10 has a head 11 at its rearward end, a shank 12 which is threaded at 13 and a drill tip 14 at its forward or leading end.

While the drill tip 14 is shown in association with a drill screw, it is to be understood that the drill tip can be used in conjunction with other types of shanks as, for example, a plain, cylindrical shank, for the purpose only of forming holes in metallic plates.

Figure 2:
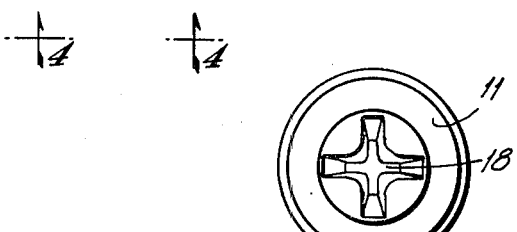
FIG. 2 is an end elevational view of the screw taken from the head end of the screw.
Figure 3:
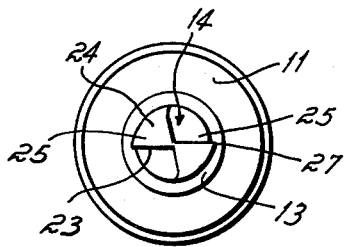
FIG. 3 is an end elevational view of the screw taken from the drill tip end of the screw.
Figure 4:
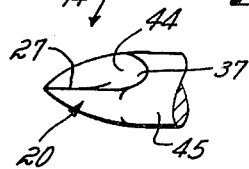
FIG. 4 is a fragmentary elevational view taken in the direction of lines 4—4 of FIG. 1.

The head 11 as shown in FIGS. 1 and 2 is slotted as at 18 for receipt of a screw driver implement or bit chucked into a power drill. The screw can be fitted with any type of head suitable for use with and adapted to be received in a power drill for rotation by the power drill.

As will be described below, the power drill is of a type capable of delivering about twenty-five hundred rpm during the hole-forming operation, the drill speed dropping substantially when the threads engage the hole formed by the drill tip. By way of example, during formation of the hole the tip advances at about 0.004 inch per revolution, while in threading the screw into the hole the screw advances at about 0.055 inch per revolution.

The drill tip is formed by forging from a blank two convex-concave half spade elements 20 which are integrally joined on the axis 21 of the shank 12 and drill tip, the juncture forming the web 22 of the drill tip. The cutting surface 23 of each land 25 terminates in a thin, continuously curved, cutting edge 27.

The spade elements 20 form two cutting surfaces 23 and two relief surfaces 24, the surfaces 23 and 24 being formed on a land 25 on each side of the drill tip.

The drill tip has a pilot end 28 having a portion of the cutting edge 27 formed as an arc 29 of a circle having a center 30 lying on the axis of the shank 12. The radius of the circle is approximately 0.045 inch. The arc 29 is approximately 90° or one-quarter of a circle. If the radius of the pilot arc is made substantially smaller, the drilling capability of the tip is reduced. For example, a tip having a pilot arc of 0.030 inch requires twice as long to form a hole, at the same pressure, as a tip having a 0.045 inch arc.

The remaining portion of each cutting edge indicated at 33 is formed as the arc of a circle whose center 34 is offset from the axis 25 of the shank and at the far side of the axis so as to have a substantially larger radius than the radius of the arc 29, the radius being, for example, three times the radius of the shank 12 or 0.150 inch.

The two arcs 29 and 33 merge smoothly into a continuous arcuate cutting edge which begins at one side of the shank 12, extends around the pilot end 28 of the drill tip and terminates at the other side of the shank 12, the cutting edge lying substantially in a plane which substantially coincides with the axis 21 of the drill tip. The dimension of the drill tip at its widest location indicated at 35, hereinafter the apex, is greater than the diameter of the shank 12 and the minor diameter of the threads 13, but less than the major diameter of the threads 13. Thus, the diameter of the cutting edge at the apex will define the size of the hole to be formed by the drill tip. That diameter hole will permit the shank 12 easily to pass through the hole. The hole, however, will be undersized with respect to the threads 13, whereby the threads 13 will engage the hole and secure the fastener to the metal through which the hole is formed.

Each cutting surface 23 is substantially planar adjacent the pilot end of the cutting tip as indicated at 36 and then curves concavely toward the shank at the trailing end of the cutting tip as indicated at 37.

The relief surface has a convex portion 40 curving smoothly away from the cutting edge 27 and radially inwardly, and a generally planar portion 41 forming a continuation of the concave portion. The convex portion is arcuate in the axial direction and has a radius of about 0.245 inch. The planar portion of each relief surface lies in a plane passing approximately through the axis of the shank.

Figure 5:
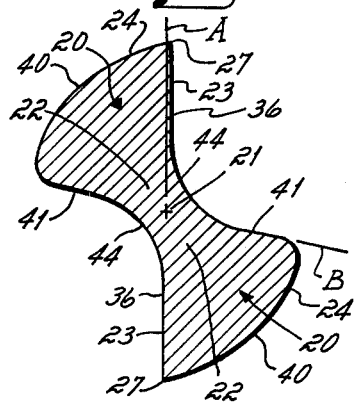
FIG. 5 is a cross-sectional view taken along lines 5—5 of FIG. 1.

The generally planar portion 41 of the relief surface 24 lies in a plane which is approximately 80° to the planar portion 36 of the cutting surface. The relief surface curves smoothly away from the cutting edge and inwardly toward the axis of the shank. The transverse dimension of the drill tip through the relief surface along the line indicated at B (FIG. 5) is substantially less than the transverse dimension through the drill tip in the plane of the cutting edge along the line indicated at A. For example, in one drill tip the diameter of the cutting edge at the apex 35 is about 9/64ths inch, whereas the comparable dimension of the relief surface through that point on the axis of the shank is approximately 7/64ths inch.

Figure 6:
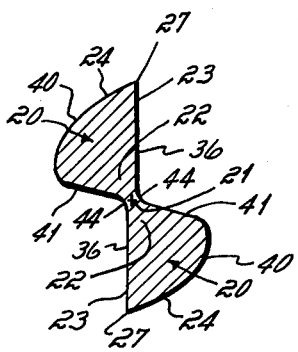
FIG. 6 is a cross-sectional view taken along lines 6—6 of FIG. 1.
Figure 7:
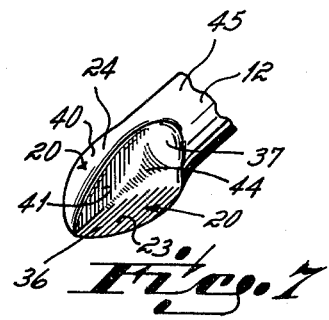
FIG. 7 is a fragmentary perspective view of the drill tip of the present invention.

Comparable dimensions taken at a point about halfway between the apex 35 and the pilot end of the drill tip, as, for example, at center 30, would be about 8/64ths inch and 4/64ths inch, respectively, as illustrated in FIG. 6. Thus, the drill tip thins down into a more spade-like configuration from the apex 35 toward the pilot end 28 of the drill tip. These dimensions will change with different sizes of screws and drill tips, but the proportions will remain generally the same.

The relief surface 24 of one land and the cutting surface 23 of the opposite land form between them a flute 44 on each side of the drill tip. The flute 44 has an angle of about 100° and presents a very substantial area for chip clearance.

The drill screw has an intermediate, substantially cylindrical, unthreaded shank portion 45 between the drill tip and the threads 13. This unthreaded portion should be of great enough axial dimension to permit the hole in the plate to be completely formed before the threads engage the plate. The hole is formed by rotating the drill tip at approximately 2500 rpm, whereas when threading into the hole, rotation is much slower. Thus, the hole must be completely formed before the drill threads engage the plate.

In the operation of the invention the drill screw is placed in the bit which is chucked in a power drill and placed against the surface of a plate 47 to which the screw is to be fastened. The surface does not require pre-dimpling since the arcuately formed cutting edge begins to remove metal immediately and thus resists sliding or walking across the surface. Even after about one-quarter of a revolution, the arcuate cutting edge portion 27 bites into the metal and begins the formation of a hole 48.

As the drill tip removes metal, turning at about 2500 rpm, the metal shavings removed from the hole are spit out of the hole past the enlarged flutes 44, the chips or shavings thus finding an easy passageway for clearance out of the hole 48.

Because of the orientation of the cutting edge, the cutting action is more of a scraping of the metal away rather than the shaving or slicing action of known drill tips.

Figure 9:
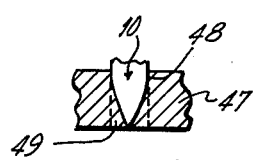
FIG. 9 is a view similar to FIG. 8 showing the drill of the present invention.
Figure 10:
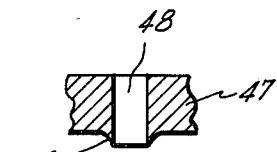
FIG. 10 is a cross-sectional view showing a drill screw in its threaded relation to the hole formed by the drill tip.

As the drill is about to penetrate through the plate, the hole and drill tip appear as illustrated in FIG. 9. Because the drill tip has a substantial axial dimension from the pilot end to the apex, a substantial uncut rim of metal 49 remains at the bottom of the hole. When that metal weakens by the axial thrust on the drill tip, the drill tip will burst through the as yet incompletely cut metal at the bottom of the hole and extrude it outwardly into a protruding flange 50, as shown in FIG. 10. That protruding flange provides an extra thickness of metal engageable by the threads on the screw to add to the gripping force of the screw with respect to the plate 47.

Figure 8:
FIG. 8 is a cross-sectional view illustrative of a prior art drill tip forming a hole.

In contrast, a conventional drilling tip is illustrated in FIG. 8. That drilling tip has a cutting edge which has very little axial dimension and as a consequence leaves very little uncut metal in the hole before it bursts through. Further, conventional drills are adapted to perform a reaming function through the flute edges after the drill has passed through the hole so as to cut away the extruded flange 50, thereby resulting in a cleaner hole than one which does not reliably leave the extruded flange for gripping purposes.

I claim:

1. A drill tip mounted on a shank comprising,
a pair of cutting elements,
each being one-half of a concave-convex spade-like element,
said elements being oppositely facing and integrally joined at the axis of said shank, the juncture of said elements forming a web in said tip,
each of said elements presenting an outboard curvilinear cutting edge which smoothly merges into said an arcuate pilot end, said curvilinear cutting edges and said arcuate pilot end forming a continuous curved cutting edge extending from one side of the shank to the diametrically opposite side thereof, said continuous cutting edge lying in a single plane generally parallel to the axis of said shank.

2. A drill tip as in claim 1,
each of said spade-like elements having a concave cutting surface terminating in said cutting edge and a convex relief surface, said surfaces defining a land,
said cutting surface having a portion lying in a plane substantially coinciding with the axis of said shank.

3. A drill tip as in claim 1 in which said arcuate pilot end has a radius of about 0.045 inch.

4. A drill tip as in claim 2,
said relief surface having a portion lying in a plane substantially coinciding with said shank.

5. A drill tip as in claim 4, said cutting surface on one element forming a flute with the relief surface on the other element, said flute defined in part by said planes lying at an angle of about 100° to each other.

6. A drill tip as in claim 4, said relief surface having a convex surface portion extending from said cutting edge curvilinearly inwardly toward the axis of said shank and merging with said plane portion.

7. A drill tip as in claim 4 in which the transverse dimension of said drill tip across said cutting edge through the axis is substantially greater than the corresponding transverse dimension across said land.

8. A drill screw including a threaded shank, a head at one end of said shank, and a drill tip formed in the forward opposite end of said shank, said drill tip comprising:
two oppositely facing cutting surfaces formed on respective sides of said shank,
two curvilinear cutting edges, formed on respective edges of said cutting surfaces, said two cutting edges smoothly merging together at a forwardmost end of said shank and forming a continuous curved cutting edge from one side of said shank to the diametrically opposite side thereof, said continuous cutting edge lying in a single plane generally parallel to the axis of said shank.

9. A drill screw as in claim 8 wherein the distance between said cutting edges on respective sides of said shank exceed the diameter of said shank.

10. A drill screw as in claim 9 wherein a portion of the threads on said shank, between said head and said drilling means, have an outside thread diameter greater than said distance between the cutting edges on respective sides of said shank.

11. A drill means as in claim 10 wherein said threads extend on said shank from a point near the head to a point near the drill tip, the distance between the terminal portion of said threads to the rearmost point of said drill tip exceeding the thickness of material into which the drill screw is to be drilled and threaded.

12. A drilling screw fastener which comprises,
a shank,
a drill tip at the forward end of the shank,
a thread on the shank spaced from the drill tip,
and an intermediate, substantially cylindrical, unthreaded shank portion between said drill tip and thread, the drill tip including a pair of cutting surfaces on opposite sides of the axis of the shank having cutting edges which lie in a plane coinciding with the axis of the shank, each cutting edge including a first arcuate portion which has its center on the axis of the shank to form the pilot end of said drill tip and a second arcuate portion extending radially outwardly from the first portion to an apex which is radially spaced from the axis a distance greater than the radius of the unthreaded shank portion and less than the outer radius of the thread, the cutting surfaces extending rearwardly from the forward end of said shank to the intermediate shank portion.

13. A drilling screw fastener as in claim 12 in which said first arcuate portion has a radius of about 0.045 inch.

14. A drilling screw fastener as in claim 13 in which said second arcuate portion has a radius of about 0.150 inch.

15. A drilling screw fastener which comprises,
a shank,
a drill tip at one end of the shank,
a thread on the shank spaced from the drill tip,
and an intermediate, substantially cylindrical, unthreaded shank portion between said drill tip and said thread, the drill tip including a pair of cutting surfaces on opposite sides of the axis of the shank having respective cutting edges which are substantially coplanar, each cutting edge including a first circularly arcuate portion which has its center on the axis of the shank and a second portion extending outwardly from the first portion to an apex which is radially spaced from the axis a distance greater than the radius of the unthreaded shank portion and less than the outer radius of the thread, the first portions extending substantially to the axis of the shank and smoothly merging together at the forwardmost end of the shank to define a continuous cutting edge from one side of the shank to the diametrically opposite side thereof, said continuous cutting edge lying in a single plane generally parallel to said axis, the cutting surfaces extending rearwardly from the first arcuate portion of the cutting edge to the intermediate shank portion spaced from the thread.

16. A drill tip at the end of a shank having an axis comprising,
a pair of cutting surfaces substantially lying in a first plane passing through said axis,
said cutting surfaces terminating in an edge lying in said plane,
said cutting edge having a pilot end which is substantially the arc of a first circle having a center lying on said axis,
the remaining portion of said cutting edge for each surface being substantially the arc of a second circle having a greater radius than said first circle,
a pair of relief surfaces having planar portions lying substantially in a second plane approximately perpendicular to said first plane, each relief surface creating an angle of approximately 100° with the adjacent cutting surface a flute.

* * * * *